(12) United States Patent
Bai

(10) Patent No.: US 12,647,158 B2
(45) Date of Patent: Jun. 2, 2026

(54) SIGNAL TRANSMISSION METHOD AND DEVICE, TERMINAL AND ACCESS NETWORK DEVICE

(71) Applicant: DATANG MOBILE COMMUNICATIONS EQUIPMENT CO., LTD., Beijing (CN)

(72) Inventor: Wei Bai, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 247 days.

(21) Appl. No.: 18/256,171

(22) PCT Filed: Sep. 10, 2021

(86) PCT No.: PCT/CN2021/117720
§ 371 (c)(1),
(2) Date: Jun. 6, 2023

(87) PCT Pub. No.: WO2022/142459
PCT Pub. Date: Jul. 7, 2022

(65) Prior Publication Data
US 2024/0063853 A1 Feb. 22, 2024

(30) Foreign Application Priority Data
Dec. 31, 2020 (CN) .......................... 202011634254.0

(51) Int. Cl.
*H04B 7/0456* (2017.01)
*H04B 7/08* (2006.01)

(52) U.S. Cl.
CPC ......... *H04B 7/0456* (2013.01); *H04B 7/0854* (2013.01)

(58) Field of Classification Search
CPC ........................... H04B 7/0456; H04B 7/0854
See application file for complete search history.

(56) References Cited

U.S. PATENT DOCUMENTS

| | | | |
|---|---|---|---|
| 10,721,023 B2 | 7/2020 | Zhang et al. | |
| 2002/0119790 A1* | 8/2002 | Judson ................... | H01Q 1/246 |
| | | | 455/12.1 |

(Continued)

FOREIGN PATENT DOCUMENTS

| | | |
|---|---|---|
| CN | 103188032 A | 7/2013 |
| CN | 105406906 A | 3/2016 |

(Continued)

OTHER PUBLICATIONS

Extended European Search Report for the corresponding European Patent Application No. 21913206.5 issued by the European Patent Office Mar. 6, 2024.

(Continued)

*Primary Examiner* — David S Huang
(74) *Attorney, Agent, or Firm* — Ladas & Parry, LLP

(57) ABSTRACT

The present disclosure discloses a signal transmission method and device, a terminal and an access network device. The method is applied to a first access network device and includes: obtaining first position information of a second access network device and obtaining second position information of a target terminal; and determining a precoding coefficient for performing precoding processing on data sent to the target terminal according to the first position information and the second position information.

10 Claims, 6 Drawing Sheets obtaining first position information of a second access network device and obtaining second position information of a target terminal — 101 determining a precoding coefficient for performing precoding processing on data sent to the target terminal according to the first position information and the second position information — 102

(56) References Cited

U.S. PATENT DOCUMENTS

| | | | |
|---|---|---|---|
| 2017/0086199 A1 | 3/2017 | Zhang et al. | |
| 2019/0044580 A1* | 2/2019 | Zhou | H04L 5/0051 |
| 2020/0153485 A1 | 5/2020 | Chen | |
| 2020/0403667 A1 | 12/2020 | Li et al. | |
| 2021/0168839 A1 | 6/2021 | Su et al. | |
| 2021/0345253 A1 | 11/2021 | Matsumura et al. | |
| 2023/0006713 A1* | 1/2023 | Zirwas | H04B 7/063 |

FOREIGN PATENT DOCUMENTS

| | | |
|---|---|---|
| CN | 106972907 A | 7/2017 |
| CN | 108282207 A | 7/2018 |
| CN | 109873665 A | 6/2019 |
| CN | 110838856 A | 2/2020 |
| CN | 111201731 A | 5/2020 |
| WO | 2019144418 A1 | 8/2019 |
| WO | 2020031352 A1 | 2/2020 |
| WO | 2020056593 A1 | 3/2020 |

OTHER PUBLICATIONS

International Search Report for PCT Application No. PCT/CN2021/117720 issued on Dec. 8, 2021 and its English Translation provided by WIPO.

Written Opinion for PCT Application No. PCT/CN2021/117720 issued on Dec. 8, 2021 and its English Translation provided by WIPO.

International Preliminary Report on Patentability for PCT Application No. PCT/CN2021/117720 issued on Jul. 4, 2023 and its English Translation provided by WIPO.

"Interference Aware Inter Cell Rank Coordination," 3GPP TSG RAN WG1 NR Ad-Hoc Meeting, R1-1701085, Spokane, USA, Jan. 16-20, 2017, Agenda item: 5.1.2.1, Source: Nokia, Alcatel-Lucent Shanghai Bell, all pages.

* cited by examiner obtaining first position information of a second access network device and obtaining second position information of a target terminal — 101 determining a precoding coefficient for performing precoding processing on data sent to the target terminal according to the first position information and the second position information — 102

1

SIGNAL TRANSMISSION METHOD AND DEVICE, TERMINAL AND ACCESS NETWORK DEVICE

CROSS-REFERENCE TO RELATED APPLICATIONS

This application is the U.S. national phase of PCT Application No. PCT/CN2021/117720 filed on Sep. 10, 2021, which claims priority to the Chinese patent application No. 202011634254.0 filed on Dec. 31, 2020 with the title "SIGNAL TRANSMISSION METHOD AND DEVICE, TERMINAL AND ACCESS NETWORK DEVICE", the disclosures of which are incorporated herein by reference in their entireties.

TECHNICAL FIELD

The present disclosure relates to the field of mobile communication technology, in particular to a data transmission method and device, a terminal and an access network device.

BACKGROUND

In a mobile communication system, in a Multi-Input Multi-Output (MIMO) scenario, the complexity of the pre-coding strategy is relatively high. Taking a cell-free massive antenna technology (Cell-free Massive MIMO) as an example, in Cell-free massive MIMO, the Access Point (AP), that is, a small base station obtains the channel state information (CSI) of all User Equipment (UE), and sends to the Central Processing Unit (CPU) through the fronthaul, after the CPU calculates and obtains the Precoding strategy, the CPU feeds back the Precoding strategy to the AP; however, the interactive data amount during the fronthaul process and the calculation amount of the CPU are huge. Therefore, it is necessary to further reduce the complexity of the Precoding strategy.

SUMMARY

The present disclosure aims to provide a signal transmission method and device, a terminal and an access device, so as to solve the problem in the related art that the complexity of the Precoding strategy is high.

In a first aspect, an embodiment of the present disclosure provides a signal transmission method, including: obtaining first position information of a second access network device and obtaining second position information of a target terminal; determining a precoding coefficient for performing precoding processing on data sent to the target terminal according to the first position information and the second position information.

Optionally, after the determining a precoding coefficient for performing precoding processing on data sent to the target terminal, the method includes: performing precoding processing on the data sent to the target terminal according to the precoding coefficient; and/or sending the precoding coefficient to the second access network device.

Optionally, the obtaining first position information of a second access network device includes: receiving the first position information sent by the second access network device; or querying the first position information of the second access network device in a preset position information record; wherein the first position information includes coordinate information of an antenna of the second access network device.

Optionally, the obtaining second position information of a target terminal includes: determining the second position information of the target terminal by a position sensing method; or receiving the second position information reported by the target terminal; wherein the second position information includes coordinate information of a reference antenna of the target terminal.

Optionally, the determining a precoding coefficient for performing precoding processing on data sent to the target terminal according to the first position information and the second position information includes: determining a first distance between a position indicated by the first position information and a position indicated by the second position information; determining an amplitude and a phase shift of the precoding coefficient according to the first distance; wherein, the amplitude is inversely proportional to the first distance; the phase shift is a product of a wave number and the first distance.

In a second aspect, an embodiment of the present disclosure provides a signal transmission method, including: determining a precoding coefficient for performing precoding processing on data sent to a target terminal; wherein, the precoding coefficient is determined by the second access network device or a first access network device according to first position information of the second access network device and second position information of the target terminal; performing precoding processing on the data sent to the target terminal according to the precoding coefficient.

Optionally, the determining the precoding coefficient for performing precoding processing on data sent to a target terminal includes: receiving the precoding coefficient sent by the first access network device; or obtaining the first position information of the second access network device and second position information of the target terminal; determining the precoding coefficient according to the first position information and the second position information.

Optionally, the obtaining first position information of the second access network device includes: receiving the first position information of the second access network device sent by the first access network device; or measuring the first position information of the second access network device.

Optionally, the obtaining second position information of the target terminal includes: receiving the second position information sent by the first access network device or the target terminal; or determining the second position information through a position sensing method.

Optionally, the determining the precoding coefficient according to the first position information and the second position information includes: determining a first distance between a position indicated by the first position information and a position indicated by the second position information; determining an amplitude and a phase shift of the precoding coefficient according to the first distance; wherein, the amplitude is inversely proportional to the first distance; and the phase shift is a product of a preset wave number and the first distance.

Optionally, before receiving the precoding coefficient sent by the first access network device, the method further includes: sending the first position information to the first access network device; wherein, the first position information includes coordinate information of an antenna of the second access network device.

Optionally, the method further comprises: sending the first position information to the target terminal.

In a third aspect, an embodiment of the present disclosure provides a signal transmission method, including: obtaining first position information of a second access network device and obtaining second position information of the target terminal; determining the first position information and the second position information, and determining a receiving array combination vector corresponding to a precoding coefficient; wherein, the precoding coefficient is determined by the second access network device or a first access network device according to the first position information and the second position information.

Optionally, the obtaining first position information of a second access network device includes: receiving the first position information of the second access network device sent by the second access network device.

Optionally, the obtaining second position information of the target terminal includes: receiving the second position information of the target terminal sent by the first access network device; or measuring the second position information of the target terminal; wherein, the second position information includes coordinate information of a reference antenna of the target terminal.

Optionally, the determining the first position information and the second position information, and determining a receiving array combination vector corresponding to a precoding coefficients include: determining a first distance between a position indicated by the first position information and a position indicated by the second position information; determining a received signal matrix between the target terminal and the second access network device according to the first distance; determining the receiving array combination vector according to the receiving signal matrix and a first data relationship.

Optionally, the first data relationship is:

$$v_n(t) = \left( A \cdot s_{n,1}(t) \cdot (s_{n,1}(t))^H \cdot A^H + \sigma_e^2 I \right)^{-1} (A \cdot s_{n,1}(t))$$

wherein, $v_n(t)$ represents the receiving array combination vector; I represents an identity matrix, and $$\sigma_e^2$$

represents a noise variance;
$s_{n,1}(t)$ represents a received signal of a reference antenna of the target terminal;

$$s_{n,1}(t) = [s_{n,1,1}(t), \ldots, s_{n,1,k}(t) \ldots, s_{n,1,K0}(t)]^T$$

k represents a first serial number of the second access network device, and a value range of k is 1 to K0; n represents a second serial number of the target terminal;
A represents the received signal matrix, wherein the kth column is:

$$A_k = \begin{bmatrix} 1 \\ \dfrac{r_k}{d_{2,k}} e^{j\frac{2\pi}{\lambda}r_k - j\frac{2\pi}{\lambda}d_{2,k}} \\ \vdots \\ \dfrac{r_k}{d_{M,k}} e^{j\frac{2\pi}{\lambda}r_k - j\frac{2\pi}{\lambda}d_{M,k}} \end{bmatrix}$$

4

$d_{m,k}$ represents the first distance, $d_{1,k}=r_k$; m represents a third serial number of the reference antenna of the target terminal, and a value range of m is 1 to M.

In a fourth aspect, an embodiment of the present disclosure provides an access network device, including: a memory, a transceiver, and a processor; wherein the memory is configured to store computer programs; the transceiver is configured to send and receive data under the control of a processor; the processor is configured to read the computer programs in the memory and perform the following operations: obtaining first position information of a second access network device and obtaining second position information of a target terminal; determining a precoding coefficient for performing precoding processing on data sent to the target terminal according to the first position information and the second position information.

Optionally, after the determining a precoding coefficient for performing precoding processing on data sent to the target terminal, the processor is further configured to read the computer programs in the memory and perform the following operations: performing precoding processing on the data sent to the target terminal according to the precoding coefficient; and/or sending the precoding coefficient to the second access network device.

Optionally, the processor is further configured to read the computer programs in the memory and perform the following operations: receiving the first position information sent by the second access network device; or querying the first position information of the second access network device in a preset position information record; wherein the first position information includes coordinate information of an antenna of the second access network device.

Optionally, the processor is further configured to read the computer programs in the memory and perform the following operations: determining the second position information of the target terminal by a position sensing method; or receiving the second position information reported by the target terminal; wherein the second position information includes coordinate information of a reference antenna of the target terminal.

Optionally, the processor is further configured to read the computer programs in the memory and perform the following operations: determining a first distance between a position indicated by the first position information and a position indicated by the second position information; determining an amplitude and a phase shift of the precoding coefficient according to the first distance; wherein, the amplitude is inversely proportional to the first distance; the phase shift is a product of a wave number and the first distance.

In a fifth aspect, an embodiment of the present disclosure provides an access network device, comprising a memory, a transceiver, and a processor; wherein the memory is configured to store computer programs; the transceiver is configured to send and receive data under the control of a processor; the processor is configured to read the computer programs in the memory and perform the following operations: determining a precoding coefficient for performing precoding processing on data sent to a target terminal; wherein, the precoding coefficient is determined by the second access network device or a first access network device according to first position information of the second access network device and second position information of the target terminal; performing precoding processing on the data sent to the target terminal according to the precoding coefficient.

Optionally, the processor is further configured to read the computer programs in the memory and perform the following operations: receiving the precoding coefficient sent by the first access network device; or obtaining the first position information of the second access network device and second position information of the target terminal; determining the precoding coefficient according to the first position information and the second position information.

Optionally, the processor is further configured to read the computer programs in the memory and perform the following operations: receiving the first position information of the second access network device sent by the first access network device; or measuring the first position information of the second access network device.

Optionally, the processor is further configured to read the computer programs in the memory and perform the following operations: receiving the second position information sent by the first access network device or the target terminal; or determining the second position information through a position sensing method.

Optionally, the processor is further configured to read the computer programs in the memory and perform the following operations: determining a first distance between a position indicated by the first position information and a position indicated by the second position information; determining an amplitude and a phase shift of the precoding coefficient according to the first distance; wherein, the amplitude is inversely proportional to the first distance; and the phase shift is a product of a preset wave number and the first distance.

Optionally, before receiving the precoding coefficient sent by the first access network device, the processor is further configured to read the computer programs in the memory and perform the following operations: sending the first position information to the first access network device; wherein, the first position information includes coordinate information of an antenna of the second access network device.

Optionally, the processor is further configured to read the computer programs in the memory and perform the following operations: sending the first position information to the target terminal.

In a sixth aspect, an embodiment of the present disclosure provides a terminal, comprising: a memory, a transceiver, and a processor; wherein the memory is configured to store computer programs; the transceiver is configured to send and receive data under the control of a processor; the processor is configured to read the computer programs in the memory and perform the following operations: obtaining first position information of a second access network device and obtaining second position information of the target terminal; determining the first position information and the second position information, and determining a receiving array combination vector corresponding to a precoding coefficient; wherein, the precoding coefficient is determined by the second access network device or a first access network device according to the first position information and the second position information.

Optionally, the processor is further configured to read the computer programs in the memory and perform the following operations: receiving the first position information of the second access network device sent by the second access network device.

Optionally, the processor is further configured to read the computer programs in the memory and perform the following operations: receiving the second position information of the target terminal sent by the first access network device; or measuring the second position information of the target terminal; wherein, the second position information includes coordinate information of a reference antenna of the target terminal.

Optionally, the processor is further configured to read the computer programs in the memory and perform the following operations: determining a first distance between a position indicated by the first position information and a position indicated by the second position information; determining a received signal matrix between the target terminal and the second access network device according to the first distance;

Optionally, the first data relationship is:

$$v_n(t) = \left(A \cdot s_{n,1}(t) \cdot (s_{n,1}(t))^H \cdot A^H + \sigma_e^2 I\right)^{-1} (A \cdot s_{n,1}(t))$$

wherein, $v_n(t)$ represents the receiving array combination vector; I represents an identity matrix, and $$\sigma_e^2$$

represents a noise variance;

$s_{n,\,1}(t)$ represents a received signal of a reference antenna of the target terminal;

$$s_{n,1}(t) = [s_{n,1,1}(t), \dots, s_{n,1,k}(t) \dots, s_{n,1,K0}(t)]^T$$

k represents a first serial number of the second access network device, and a value range of k is 1 to K0; n represents a second serial number of the target terminal;

A represents the received signal matrix, wherein the kth column is:

$$A_k = \begin{bmatrix} 1 \\ \frac{r_k}{d_{2,k}} e^{j\frac{2\pi}{\lambda}r_k - j\frac{2\pi}{\lambda}d_{2,k}} \\ \vdots \\ \frac{r_k}{d_{M,k}} e^{j\frac{2\pi}{\lambda}r_k - j\frac{2\pi}{\lambda}d_{M,k}} \end{bmatrix}$$

$d_{m,\,k}$ represents the first distance, $d_{1,\,k}=r_k$; m represents a third serial number of the reference antenna of the target terminal, and a value range of m is 1 to M.

In a seventh aspect, an embodiment of the present disclosure provides a signal transmission device, including: a position obtaining module, configured to obtain first position information of a second access network device and obtaining second position information of a target terminal; a coefficient determination module, configured to determine a precoding coefficient for performing precoding processing on data sent to the target terminal according to the first position information and the second position information.

In an eighth aspect, an embodiment of the present disclosure provides a signal transmission device, including: a precoding determination module, configured to determine a precoding coefficient for performing precoding processing on data sent to a target terminal; wherein, the precoding coefficient is determined by the second access network device or a first access network device according to first position information of the second access network device and second position information of the target terminal; a precoding processing module, configured to perform precoding processing on the data sent to the target terminal according to the precoding coefficient.

In a ninth aspect, an embodiment of the present disclosure provides a signal transmission device, including: an information obtaining module, configured to obtain first position information of a second access network device and obtaining second position information of the target terminal; a vector determination module, configured to determine the first position information and the second position information, and determining a receiving array combination vector corresponding to a precoding coefficient; wherein, the precoding coefficient is determined by the second access network device or a first access network device according to the first position information and the second position information.

In a tenth aspect, an embodiment of the present disclosure provides an electrical device, including a memory, a processor and a computer program stored on the memory and executed by the processor, so that the process implement the steps of the above methods.

In an eleventh aspect, an embodiment of the present disclosure provides a processor-readable storage medium, storing a computer program, wherein the computer program is executed by a processor to implement the above method.

In the embodiment of the present disclosure, the first access network device obtains the first position information of the second access network device and obtains the second position information of the target terminal; determine the precoding coefficients for performing precoding processing on data sent to the target terminal according to the first position information and the second position information, so that the first access network device or the second access network device performs precoding processing on downlink data sent to the target terminal according to the precoding coefficients, to eliminate co-channel interference. In the embodiment of the present disclosure, the process of determining the precoding coefficient is simple, easy to implement, and can reduce the implementation complexity of massive MIMO.

BRIEF DESCRIPTION OF THE DRAWINGS

In order to more clearly illustrate the technical solutions of the embodiments of the present disclosure, the following will briefly introduce the drawings that need to be used in the description of the embodiments of the present disclosure. Obviously, the accompanying drawings in the following description are only some embodiments of the present disclosure, for those skilled in the art, other drawings can also be obtained according to these drawings without creative work.

DETAILED DESCRIPTION

Figure 1:
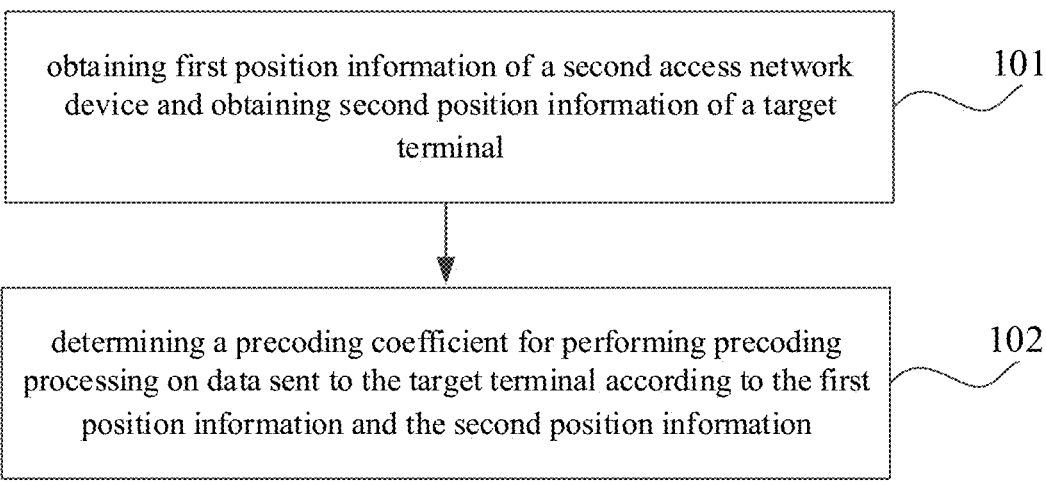
FIG. 1 is a first flowchart of the signal transmission method provided by an embodiment of the present disclosure.

The technical solutions in the embodiments of the present disclosure will be clearly and completely described below in conjunction with the accompanying drawings in the embodiments of the present disclosure. Obviously, the described embodiments are only some of the embodiments of the present disclosure, not all of them. Based on the embodiments in the present disclosure, all other embodiments obtained by persons of ordinary skill in the art without making creative efforts belong to the scope of protection of the present disclosure.

The term "and/or" in the embodiments of the present disclosure describes the association relationship of associated objects, indicating that there may be three relationships, for example, A and/or B, which may mean: A exists alone, A and B exist simultaneously, and B exists alone These three situations. The character "/" generally indicates that the contextual objects are an "or" relationship.

The term "plurality" in the embodiments of the present disclosure refers to two or more, and other quantifiers are similar.

Embodiments of the present disclosure provide a signal transmission method and device, a terminal, and an access network device, so as to reduce the implementation complexity of massive MIMO.

Among them, the method and the device are conceived based on the same disclosure. Since the principle of solving problems of the method and the device is similar, the implementation of the device and the method can be referred to each other, and the repetition will not be repeated.

In addition, the technical solution provided by the embodiment of the present disclosure can be applied to various systems, especially the fifth generation communication technology (The 5th Generation Mobile Communication Technology, 5G), the sixth generation communication technology (The 6th Generation Mobile Communication Technology, 6G). For example, the applicable system may be global system of mobile communication (GSM) system, code division multiple access (code division multiple access, CDMA) system, wideband code division multiple access (Wideband Code Division Multiple Access, WCDMA) general packet Wireless service (general packet radio service, GPRS) system, long term evolution (long term evolution, LTE) system, LTE frequency division duplex (frequency division duplex, FDD) system, LTE time division duplex (time division duplex, TDD) system, Long term evolution advanced (LTE-A) system, universal mobile telecommunications system (UMTS), worldwide interoperability for microwave access (WiMAX) system, 5G new air interface (New Radio, NR) system, etc. These various systems include end devices and network devices. The system may also include a core network part, such as an evolved packet system (Evolved Packet System, EPS), a 5G system (5GS), and the like.

The terminal device involved in this embodiment of the present disclosure may be a device that provides voice and/or data connectivity to a user, a handheld device with a wireless connection function, or other processing devices connected to a wireless modem. In different systems, the name of the terminal equipment may be different. For example, in a 5G system, the terminal equipment may be called user equipment (User Equipment, UE). Wireless terminal equipment can communicate with one or more core networks (Core Network, CN) via a radio access network (Radio Access Network, RAN). The wireless terminal equipment can be a mobile terminal equipment, such as a mobile phone (or called a "cellular" telephones) and computers with mobile terminal equipment, such as portable, pocket, hand-held, computer built-in or vehicle-mounted mobile devices, which exchange language and/or data with the radio access network. For example, Personal Communication Service (PCS) phones, cordless phones, Session Initiated Protocol (SIP) phones, Wireless Local Loop (WLL) stations, Personal Digital Assistant, PDA) and other devices. Wireless terminal equipment can also be called system, subscriber unit, subscriber station, mobile station, mobile station, remote station, access point, a remote terminal (remote terminal), an access terminal (access terminal), a user terminal (user terminal), a user agent (user agent), and a user device (user device), which are not limited in this embodiment of the present disclosure.

The network device involved in this embodiment of the present disclosure may be a base station, and the base station may include multiple cells that provide services for terminals. Depending on the specific disclosure, the base station can also be called an access point, or it can be a device in the access network that communicates with the wireless terminal device through one or more sectors on the air interface, or other names. Network devices can be used to interchange received over-the-air frames with Internet Protocol (IP) packets and act as routers between wireless end devices and the rest of the access network, which can include the Internet Protocol (IP) communication network. Network devices may also coordinate attribute management for the air interface. For example, the network device involved in this embodiment of the present disclosure may be a network device (Base Transceiver Station, BTS) in Global System for Mobile communications (GSM) or Code Division Multiple Access (CDMA).), or a network device (NodeB) in Wide-band Code Division Multiple Access (WCDMA), or an evolved network device in a long term evolution (LTE) system (evolutional Node B, eNB or e-NodeB), 5G base station (gNB) in the 5G network architecture (next generation system), can also be a home evolved base station (Home evolved Node B, HeNB), relay node (relay node), a home base station (femto), a pico base station (pico), etc., are not limited in this embodiment of the present disclosure. In some network structures, a network device may include a centralized unit (centralized unit, CU) node and a distributed unit (distributed unit, DU) node, and the centralized unit and the distributed unit may also be arranged geographically separately.

One or more antennas can be used between network devices and terminal devices for Multi Input Multi Output (MIMO) transmission, and MIMO transmission can be Single User MIMO (Single User MIMO, SU-MIMO) or Multi-User MIMO (Multiple User MIMO, MU-MIMO). According to the shape and number of root antenna combinations, MIMO transmission can be 2D-MIMO, 3D-MIMO, FD-MIMO, or massive-MIMO, or diversity transmission, precoding transmission, or beamforming transmission, etc.

FIG. 1 shows a schematic flowchart of a signal transmission method provided by an embodiment of the present disclosure.

As shown in FIG. 1, the embodiment of the present disclosure provides a signal transmission method, which is applied to a first access network device, and the first access network device may be a CPU or a centralized unit (CU). In the embodiment of the present disclosure, if the first access network device is a CPU, then a corresponding second access network device is an AP; if the first access network device is a CU, then the corresponding second access network device is a distributed unit (DU).

The methods include:

Step 101, obtaining first position information of a second access network device and obtaining second position information of a target terminal.

Figure 2:
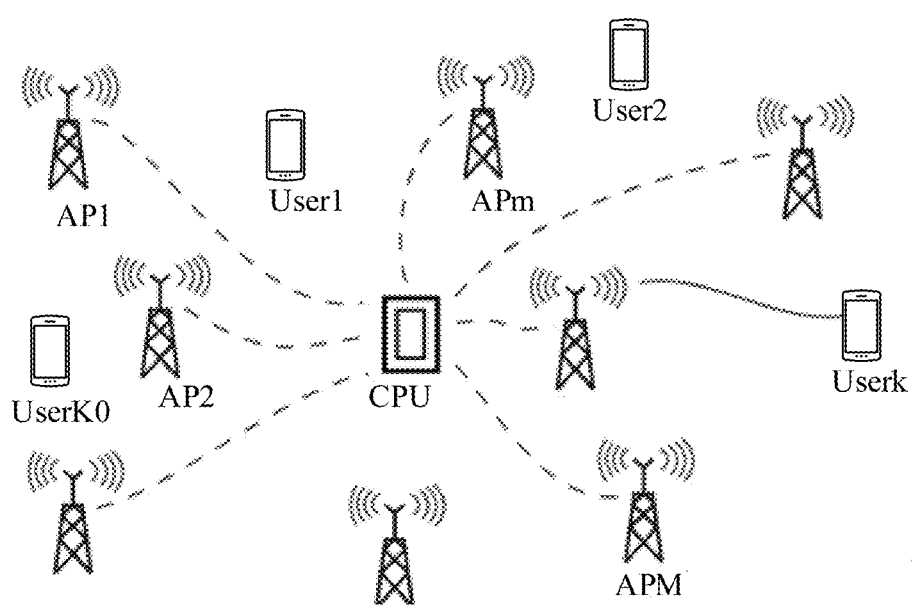
FIG. 2 is a schematic diagram of a first example provided by an embodiment of the present disclosure.

Wherein, the second access network device may be an AP or a DU; as a first example, with reference to FIG. 2, the method is applied to a CPU as an example, and FIG. 2 includes a CPU, multiple UEs (User1 to UserK0) and multiple APs (AP1 to APM); Cell-free massive MIMO combines traditional concepts such as massive MIMO, small cell, and user-centric Joint Transmission Coordinated MultiPoint (JT-CoMP); a large number of access points (AP, that is, small base stations) are deployed within the coverage area, the purpose is to reduce path loss; all APs jointly serve all UEs, so as to remove interference; all APs are connected to a central processing Unit (CPU), the CPU provides the precoding strategy of the network. With regard to the performance of Cell-free massive MIMO, due to the cooperation between APs, all APs serve all UEs, which is significantly improved the performance to solve interference problems as compared with no cooperation or only cooperation of UEs at the edge of the cell.

The first access network device obtains the first position information of the second access network device and the second position information of the target terminal, the first position information indicates the first position of the second access network device, and the second position information indicates the second position of the target terminal.

Step 102: Determining a precoding coefficient for performing precoding processing on data sent to the target terminal according to the first position information and the second position information.

After determining the first position information and the second position information, the first access network device determines a precoding coefficient according to a preset calculation rule or method; the precoding coefficient is the precoding coefficient for performing precoding processing on downlink data when the second access network device sends the downlink data to the target UE; specifically, traditional precoding refers to using channel state information (CSI) to preprocess the transmitted signal to improve system capacity and reduce BER. In a multi-terminal MIMO scenario, the access network devices use the same frequency and the same slot to communicate with multiple terminal users, so co-channel interference will occur. At this time, it is difficult for the terminal to take effective measures to eliminate the impact of interference, so the access network device needs to adopt a certain technology to eliminate co-channel interference, that is, precoding technology.

In the embodiment of the present disclosure, the first access network device obtains the first position information of the second access network device and obtains the second position information of the target terminal; determine the precoding coefficients for performing precoding processing on data sent to the target terminal according to the first position information and the second position information, so that the first access network device or the second access network device performs precoding processing on downlink data sent to the target terminal according to the precoding coefficients, to eliminate co-channel interference. In the embodiment of the present disclosure, the process of determining the precoding coefficient is simple, easy to implement, and can reduce the implementation complexity of massive MIMO; the embodiments of the present disclosure solves the problem in the relate art of high complexity of the precoding strategy.

In an optional embodiment, after the determining a precoding coefficient for performing precoding processing on the data sent to the target terminal, the method includes:

performing precoding processing on data sent to the target terminal according to the precoding coefficient; and/or sending the precoding coefficient to the second access network device.

Wherein, when the first access network device is a CU, the CU performs precoding processing on the data sent to the target terminal according to the precoding coefficient; when the first access network device is a CPU, the CPU sends the precoding coefficient to the second access network device, so that the second access network device performs precoding processing on the data sent to the target terminal.

In an optional embodiment, the obtaining the first position information of the second access network device includes:

receiving the first position information sent by the second access network device; or querying the first position information of the second access network device in a preset position information record;

Wherein, the first position information includes coordinate information of an antenna of the second access network device.

Taking the second access network device as an AP as an example, in the downlink massive MIMO system, the set of APs is B={1, . . . , B}, each AP has M transmitting antennas, and M is a positive integer greater than or equal to 1; the precoding coefficient is corresponding to each transmitting antenna; for example, the CPU calculates a precoding coefficient of each transmitting antenna of the AP according to the first position information of all antennas of the AP and the second position information of the target UE, and sends the precoding coefficient to the corresponding AP, so that signals of all the transmitting antennas of the AP focus on the second position information of the target UE.

When the first access network device obtains the first position information of the second access network device, it may receive the first position information actively sent by the second access network device, for example, the AP broadcasts the position information of each transmitting antenna of AP to the CPU. It may also be that the first access network device queries the first position information of the second access network device in the preset position information record, for example, the AP registers the geographical positions of all antennas of AP with the CPU through the fronthaul, and the CPU records the first position information of each transmitting antenna in the preset position information record, which is convenient for subsequent query and use.

In an optional embodiment, the obtaining the second position information of the target terminal includes:

Determining the second position information of the target terminal by a position sensing method; or receiving the second position information reported by the target terminal;

Wherein, the second position information includes coordinate information of a reference antenna of the target terminal.

In this embodiment of the present disclosure, position sensing refers to actively determining the device to be positioned during the positioning process, for example, the first access network device actively sends a sensing signal to the target terminal, and determines the second position information of the target terminal according to the feedback of the target terminal on the sensing signal. In addition, the first access network device may also receive second position information reported by the target terminal in real time.

If the target UE includes N receiving antennas, the second position information includes coordinate information of a reference antenna of the target terminal; for example, the reference antenna is an antenna at a central position among all receiving antennas.

In an optional embodiment, the determining a precoding coefficient for performing precoding processing on data sent to the target terminal according to the first position information and the second position information includes:

Determining a first distance between a position indicated by the first position information and a position indicated by the second position information; determining an amplitude and a phase shift of the precoding coefficient according to the first distance; wherein, the amplitude is inversely proportional to the first distance;

The phase shift is a product of the wave number and the first distance.

Wherein, $d_{m, k}$ is used to represent the first distance, k represents the kth receiving antenna of the target terminal; m represents the mth AP; wherein, if an AP includes L transmitting antennas, the AP can be equivalent to L APs; the amplitude is inversely proportional to the first distance, for example, $$A = \frac{C_0}{d_{m,k}};$$

wherein, A represents the amplitude, and $C_0$ is a preset constant, for the selection of constant $C_0$, it may be that the AP performs power alposition after considering the QoS of all target UEs, for example, normalizing the number of target users.

The phase shift is the product of the wave number and the first distance, the wave number is the number of cycles per unit length of the transmitted signal in the direction of wave propagation, and the wave number is represented by $$\frac{2\pi}{\lambda},$$

where λ represents the wavelength of the transmitted signal, which is a preset value; then $$P = \frac{2\pi}{\lambda} d_{1,k},$$

wherein P represents the phase shift.

In this embodiment of the present disclosure, the first access network device obtains the first position information of the second access network device and obtains the second position information of the target terminal; determine a precoding coefficient for performing precoding processing on data sent to the target terminal according to the first position information and the second position information, so that the first access network device or the second access network device performs precoding processing on downlink data sent to the target terminal according to the precoding coefficient, to eliminate co-channel interference. In the embodiment of the present disclosure, the determination process of the precoding coefficient is simple and easy to implement.

Figure 3:
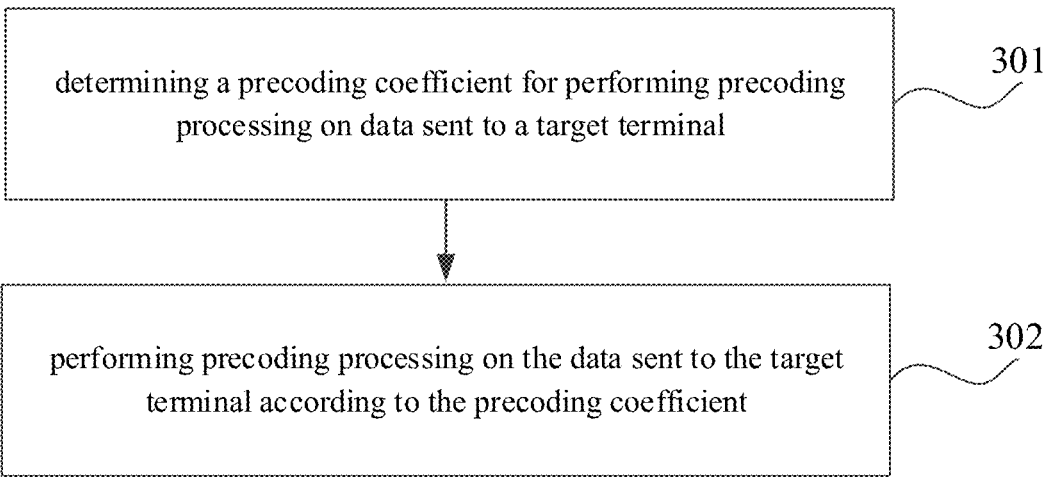
FIG. 3 is a second flowchart of the signal transmission method provided by an embodiment of the present disclosure.

Referring to FIG. 3, an embodiment of the present disclosure further provides a signal transmission method, which is applied to a second access network device. Optionally, the second access network device is an AP. FIG. 2 includes CPU, multiple UEs (User1 to UserK0) and multiple APs (AP1 to APM); Cell-free massive MIMO combines traditional concepts such as massive MIMO, small cell, and user-centric JT-CoMP; APs are deployed within the coverage area to reduce path loss; all APs jointly serve all UEs to remove interference; all APs are connected to one CPU, and the CPU gives the precoding strategy of the network. With regard to the performance of Cell-free massive MIMO, due to the cooperation between APs, all APs serve all UEs, the performed is significantly improved to solve interference problem as compared with no cooperation or only cooperation of the UE at the edge of the cell.

The methods include:

Step 301, determining a precoding coefficient for performing precoding processing on data sent to the target terminal; wherein, the precoding coefficient is determined by the second access network device or the first access network device according to the first position information of the second access network device and the second position information of the target terminal.

Wherein, the precoding coefficient is the precoding coefficient for performing precoding processing on the downlink data when the second access network device sends the downlink data to the target UE; in the embodiment of the present disclosure, the precoding coefficient is determined by the second access network device or the first access network device according to the first position information of the second access network device and the second position information of the target terminal. For example, after the second access network device obtains the second position information of the target UE, it determines the precoding coefficient according to the first position information and the second position information; or, after the first access network device (such as a CPU) determines the precoding coefficient according to the first position information and the second position information, it sends the precoding coefficient to the second access network device.

Step 302: Performing precoding processing on data sent to the target terminal according to the precoding coefficient.

After the second access network device determines the precoding coefficient, it performs precoding processing on the downlink data sent to the target UE to eliminate co-channel interference; specifically, precoding refers to processing and using CSI to preprocess the transmitted signal to improve the system capacity and reduce bit error rate. In a multi-terminal MIMO scenario, the access network device uses the same frequency and the same slot to communicate with multiple terminal users, so co-channel interference will occur. At this time, it is difficult for the terminal to take effective measures to eliminate the impact of interference, so the access network device needs to adopt certain technologies to eliminate co-channel interference, which is, precoding processing.

Taking the second access network device as an AP as an example, in the downlink massive MIMO system, the set of APs is B={1, . . . , B}, each AP has M transmitting antennas, and M is a positive integer greater than or equal to 1; the precoding coefficient is corresponding to each transmitting antenna; for example, the CPU calculates a precoding coefficient of each transmitting antenna of the AP according to the first position information of all antennas of the AP and the second position information of the target UE, so that signals of all the transmitting antennas of the AP focus on the second position information of the target UE.

In the embodiment of the present disclosure, the precoding coefficient for performing precoding processing on the data sent to the target terminal is determined; the data sent to the target terminal is precoded according to the precoding coefficient, so as to eliminate co-channel interference. In the embodiment of the present disclosure, the process of determining the precoding coefficient is simple, easy to implement, and can reduce the implementation complexity of massive MIMO.

In an optional embodiment, the determining the precoding coefficient for performing precoding processing on the data sent to the target terminal includes:

receiving the precoding coefficient sent by the first access network device; after the first access network device (such as a CPU) determines the precoding coefficient according to the first position information and the second position information, sending the precoding coefficient to the second access network device.

or obtaining the first position information of the second access network device and second position information of the target terminal; determine the precoding coefficient according to the first position information and the second position information. After obtaining the second position information of the target UE, the second access network device determines the precoding coefficient according to the first position information and the second position information.

In an optional embodiment, the obtaining the first position information of the second access network device includes:

receiving the first position information of the second access network device sent by the first access network device; the first position information of the second access network device may be pre-recorded in the position information record by the first access network device, and send to the second access network device. For example, the AP registers the geographical positions of all antennas of AP with the CPU in advance through the fronthaul, and the CPU records the first position information of each transmitting antenna in the preset position information record, which is convenient for subsequent query and use.

or measuring the first position information of the second access network device, and the second access network device may also actively measure the position information.

In an optional embodiment, the obtaining the second position information of the target terminal includes:

receiving the second position information sent by the first access network device or the target terminal; the target UE may actively send the second position information to the second access network device; or after the first access network device obtains the position information of the target terminal, forwarding the first position information to the second access network device.

or

Determining the second position information through position sensing; position sensing refers to actively determining a device to be positioned during the positioning process, for example, the second access network device actively sends a sensing signal to the target terminal, and determine the second position information of the target terminal according to the feedback of the target terminal on the sensing signal. Optionally, the specific method of position sensing is, for example, the wavenumber domain synthetic aperture radar (SAR) imaging method; in the sensing process, when the reflection path needs to be processed, a change of the electric field of a reflector can be estimated according to the electric field emitted by the AP and the electric field reflected by the reflector received by the AP, and then the position coordinates of the reflector can be estimated.

In an optional embodiment, the determining the precoding coefficient according to the first position information and the second position information includes:

determining a first distance between a position indicated by the first position information and a position indicated by the second position information;

determining an amplitude and a phase shift of the precoding coefficient according to the first distance; wherein, the amplitude is inversely proportional to the first distance; and the phase shift is a product of a preset wave number and the first distance.

Wherein, the precoding coefficient includes the amplitude and the phase shift. $d_{m,k}$ represents the first distance, and k represents the kth receiving antenna of the target terminal, which will be referred to as a first serial number; m represents the mth transmitting antenna of the second access network device, which will be referred to as a second sequence number; the amplitude is inversely proportional to the first distance, for example, $$A = \frac{C_0}{d_{m,k}};$$

wherein, A represents the amplitude, and $C_0$ is a preset constant, and for the selection of constant $C_0$, AP performs power allocation after considering the QoS of all target UEs, such as normalizing the number of target users.

The phase shift is the product of the wave number and the first distance, the wave number is the number of cycles per unit length of the transmitted signal in the direction of wave propagation, and the wave number is represented by $$\frac{2\pi}{\lambda},$$

wherein $\lambda$ represents the wavelength of the transmitted signal, which is a preset value; then $$P = \frac{2\pi}{\lambda}d_{1,k},$$

where P represents the phase shift.

In an optional embodiment, before receiving the precoding coefficient sent by the first access network device, the method further includes:

sending the first position information to the first access network device; wherein, the first position information includes coordinate information of an antenna of the second access network device, and the second access network device may have multiple transmitting antennas, the second access network device sends the first position information of all transmitting antennas thereof to the first access network device, so as to determine the precoding coefficient of each transmitting antenna.

In an optional embodiment, the method also includes:

Sending the first position information to the target terminal, so that the target UE determines a receiving array combination vector corresponding to the precoding coefficient, so as to receive a precoded downlink data sent by each second access network device.

In the embodiment of the present disclosure, the precoding coefficient for performing precoding processing on the data sent to the target terminal is determined; the data sent to the target terminal is precoded according to the precoding coefficient, so as to eliminate co-channel interference. In the embodiment of the present disclosure, the process of determining the precoding coefficient is simple, easy to implement, and can reduce the implementation complexity of massive MIMO.

Figure 4:
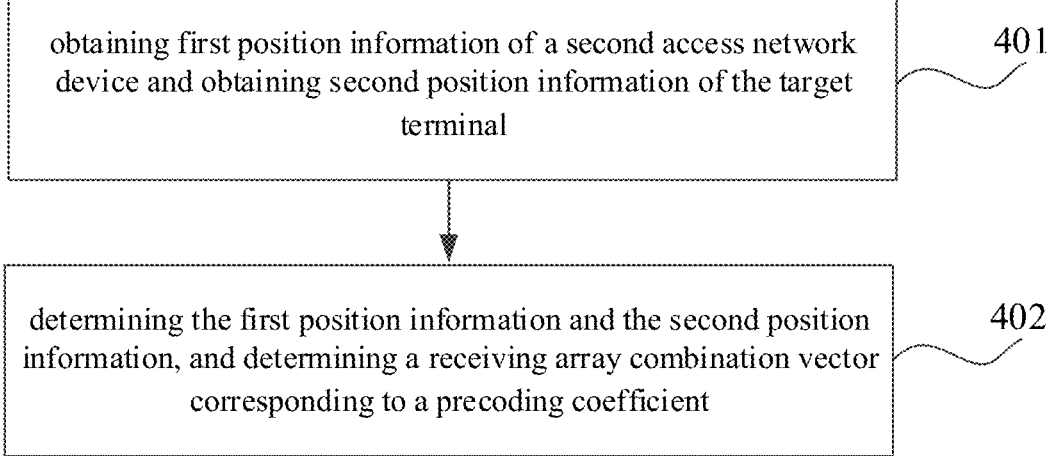
FIG. 4 is a third flowchart of the signal transmission method provided by an embodiment of the present disclosure.

Referring to FIG. 4, the embodiment of the present disclosure provides a signal transmission method, which is applied to the target terminal. In combination with FIG. 2, FIG. 2 includes CPU, multiple UEs (User1 to UserK0) and multiple APs (AP1 to APM); the target terminal is any UE from User1 to UserK0; Cell-free massive MIMO combines traditional concepts such as massive MIMO, small cell, and user-centered JT-CoMP; the purpose of deploying APs within the coverage area is to reduce path loss; all APs jointly serve all UEs, the purpose is to remove interference; all APs are connected to one CPU, and the CPU provides the precoding strategy of the network. With regard to the performance of Cell-free massive MIMO, due to the cooperation between APs, all APs serve all UEs, which is significantly improved the performance to solve interference problem as compared with no cooperation or only cooperation of the UE at the edge of the cell.

The methods include:

Step 401, obtaining first position information of a second access network device and obtaining second position information of a target terminal.

The second access network device may be an AP or a DU; in the downlink massive MIMO system, each AP has M transmitting antennas, and M is a positive integer greater than or equal to 1.

Step 402, determining the first position information and the second position information, and determining a receiving array combination vector corresponding to a precoding coefficient;

Wherein, the precoding coefficient is determined by the second access network device or the first access network device according to the first position information and the second position information.

The precoding coefficient is a precoding coefficient corresponding to each transmitting antenna. For example, the precoding coefficient of each transmitting antenna of the AP is calculated according to the first position information of all antennas of the AP and the second position information of the target UE, so that signals of all transmitting antennas of the AP focus on the second position information of the target UE.

The target UE determines a receiving array combination vector corresponding to the precoding coefficient according to the first position information and the second position information, so as to receive the precoded downlink data and realize optimal reception of the downlink data.

In the embodiment of the present disclosure, the first position information of the second access network device and the second position information of the target terminal are obtained; the first position information and the second position information are determined, and the receiving array combination vector corresponding to the precoding coefficient is determined to achieve optimal reception of downlink data. In the embodiment of the present disclosure, the precoding strategy is simple, easy to implement, and can reduce the implementation complexity of massive MIMO.

In an optional embodiment, the obtaining the first position information of the second access network device includes:

Receiving the first position information of the second access network device sent by the second access network device.

The target UE receives the second position information sent by the second access network device, and is used to determine the receiving array combination vector.

In an optional embodiment, the obtaining the second position information of the target terminal includes:

receiving the second position information of the target terminal sent by the first access network device; the second position information may be pre-recorded in the position information record by the first access network device and sent to the target UE. For example, the target UE registers the geographical positions of all antennas of target UE with the CPU in advance, and the CPU records the second position information of each transmitting antenna in the preset position information record, which is convenient for subsequent query and use.

or

Measuring the second position information of the target terminal; wherein, the second position information includes coordinate information of a reference antenna of the target terminal; the reference antenna can be preset, or selecting an antenna close to a center of positions of all receiving antennas as a reference antenna.

In an optional embodiment, the determining the first position information and the second position information, and determining the receiving array combination vector corresponding to the precoding coefficients include:

Determining a first distance between a position indicated by the first position information and a position indicated by the second position information; the first distance is a distance between the transmitting antenna and the reference antenna.

Determining a received signal matrix between the target terminal and the second access network device according to the first distance; the received signal matrix includes received signals of each receiving antenna of the UE.

Determining a receiving array combination vector according to the receiving signal matrix and a first data relationship.

In an optional embodiment, the first data relationship is shown in the following formula 1:

$$v_n(t) = \left(A \cdot s_{n,1}(t) \cdot (s_{n,1}(t))^H \cdot A^H + \sigma_e^2 I\right)^{-1} (A \cdot s_{n,1}(t))$$

Wherein, $v_n(t)$ represents the receiving array combination vector; $I$ represents an identity matrix, and $$\sigma_e^2$$

represents a noise variance, i.e. the noise variance of the transmitted signal;

$s_{n,\,1}(t)$ represents the received signal of the reference antenna of the target terminal, that is, the elements in the received signal matrix;

$$s_{n,1}(t) = [s_{n,1,1}(t), \ldots, s_{n,1,k}(t) \ldots, s_{n,1,K0}(t)]^T$$

k represents the first serial number of the second access network device, and the value range of k is 1 to K0; n represents the second serial number of the target terminal;

A represents the received signal matrix, wherein the kth column is $$A_k = \begin{bmatrix} 1 \\ \frac{r_k}{d_{2,k}} e^{j\frac{2\pi}{\lambda}r_k - j\frac{2\pi}{\lambda}d_{2,k}} \\ \vdots \\ \frac{r_k}{d_{M,k}} e^{j\frac{2\pi}{\lambda}r_k - j\frac{2\pi}{\lambda}d_{M,k}} \end{bmatrix}$$

$d_{m,\,k}$ represents the first distance, $d_{1,\,k}=r_k$; m represents the third serial number of the reference antenna of the target terminal, and the value range of m is 1 to M.

As a second example, taking the second access network device as an AP as an example, in the process of sending downlink data, if K0 APs jointly send single-stream data $d_n$ to the nth target UE, and the time delay that $d_n$ of K0 APs reaches the nth target UE is smaller than a length of the cyclic prefix (CP) of Orthogonal Frequency Division Multiplexing (OFDM). First, only the Line Of Sight (LOS) path is considered, and the quasi-LOS path is considered when there is no LOS path, that is, the LOS path obtained by reconfigurable intelligent surface (RIS) reflection. If there is no LOS path and quasi-LOS path LOS path, then the strongest None Line Of Sight (NLOS) path is considered.

For the nth target UE, a set of APs with LOS paths, quasi-LOS paths or the strongest NLOS paths is represented as $B_n$, and the number of elements in $B_n$ may be equal to K0. The kth AP is shown as S in FIG. 5. For an AP with multiple transmitting antennas, the AP can be equivalent to multiple APs each with a single transmitting antenna.

Figure 5:
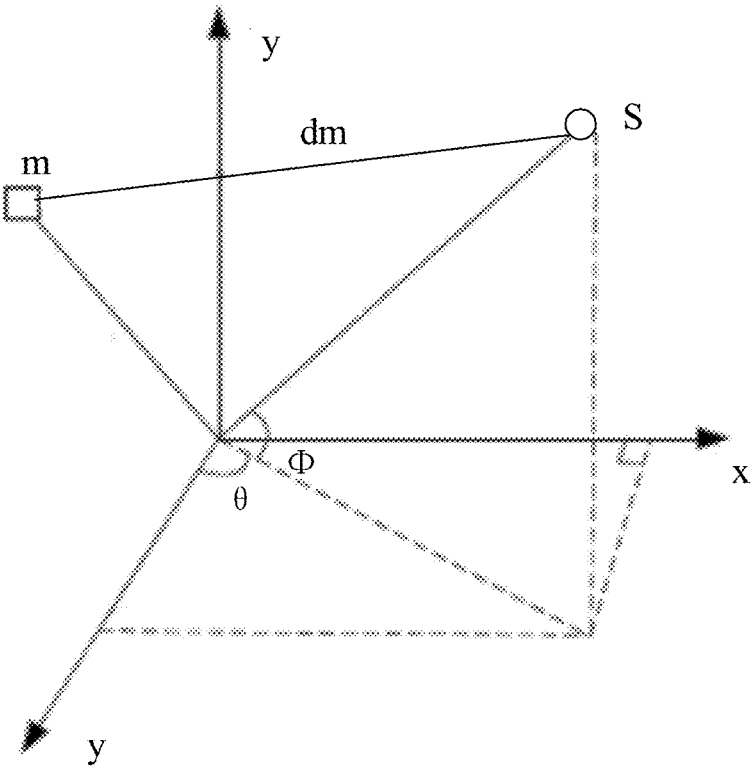
FIG. 5 is a schematic diagram of a second example provided by an embodiment of the present disclosure.

For the nth target UE, there are M receiving antennas to form a uniform linear array (ULA), where the mth receiving antenna is shown as m in FIG. 5, and the center coordinates of m are $(x_m, y_m, z_m)$.

Therefore, the distance between the kth AP and the mth receiving antenna of the nth target UE is:

$$d_{m,k} =$$
$$\left[ (x_k - r_k \cos(\varphi_k)\cos(\theta_k))^2 + (y_k - r_k\cos(\varphi_k)\sin(\theta_k))^2 + (z_k - r_k\sin(\varphi_k))^2 \right]^{1/2}$$

In the first step, the beam formed by K0 APs is focused on the coordinate origin (that is, the coordinate axis origin of the xyz coordinate system in FIG. 3).

The distance between the kth AP and the coordinate origin is $d_{1,\,k}$, and the electric field of the kth AP at the coordinate origin can be obtained as:

$$E_k = \frac{a_{1,k}}{d_{1,k}} e^{j\phi_{1,k}} e^{-j\frac{2\pi}{\lambda}d_{1,k}}$$

Among them, $a_{1,\,k}$ is the amplitude of the precoding coefficient of the data of the nth target UE by the kth AP, which can take the value $$\frac{C_0}{d_{1,k}},$$

and $C_0$ is a preset constant, that is, the amplitude of the precoding coefficient is inversely proportional to the distance.

Therefore, the farther the AP and UE are from each other, the smaller the signal power that the AP sends to the UE to avoid interference to other UEs between the AP and the UE; $\phi_{1,\,k}$ represents the precoding phase shift of the K0th AP with the data of nth target UE, which may take a value of $$\frac{2\pi}{\lambda}d_{1,k}.$$

Among them, since the positioning accuracy can only reach the centimeter (cm) level, interactive correction is required. For example, the CPU scans multiple geographical positions near the perceived geographical position of the target UE, and the target UE feedbacks electrical filed strength at the position of each geographical position, the geographical position with the highest strength is the real geographical position of the target UE.

The second step is to enable the receiving antenna array of the nth target UE to achieve optimal reception.

On the mth receiving antenna of the nth target UE, the signal of the kth AP is $s_{n,\,m,\,k}(t)\cdot d_n$, where:

$$s_{n,m,k}(t) = \frac{w_{n,k}}{d_{m,k}} e^{j\omega t - j\frac{2\pi}{\lambda}d_{m,k}}$$

Among them, $w_{n,\,k}$ means that K0 APs perform precoding for the nth target UE, $$w_{n,k} = a_{1,k} e^{j\frac{2\pi}{\lambda}d_{1,k}};$$

For the first receiving antenna of the nth target UE at the coordinate origin, $d_{1,\,k}=r_k$, so:

$$s_{n,1,k}(t) = \frac{w_{n,k}}{r_k} e^{j\omega t - j\frac{2\pi}{\lambda}r_k} = \frac{C_0}{(r_k)^2} e^{j\omega t}$$

Taking this receiving antenna as a reference point, we can get:

$$s_{n,1}(t) = [s_{n,1,1}(t), \ldots, s_{n,1,K}(t)]^T$$

$$A = [A_1, \ldots, A_K]$$

$$A_k = \begin{bmatrix} 1 \\ \frac{r_k}{d_{2,k}} e^{j\frac{2\pi}{\lambda}r_k - j\frac{2\pi}{\lambda}d_{2,k}} \\ \vdots \\ \frac{r_k}{d_{M,k}} e^{j\frac{2\pi}{\lambda}r_k - j\frac{2\pi}{\lambda}d_{M,k}} \end{bmatrix}$$

A represents the received signal matrix; then, the received signals of the M receiving antennas are:

$$x_n(t) = [x_{n,1}(t), \ldots, x_{n,M}(t)]^T$$

then:

$$x_n(t) = A \cdot s_{n,1}(t) \cdot d_n + e_n(t)$$

That is, the array antenna receiving signal of the nth target UE is $x_n(t)$, and K0 APs send $d_n$ and other signals of the UE (only considering the alignment of effective signals, and the interference signals are not aligned), and when the received signals of K APs arrive at the coordinate the origin $s_{n,\,1}(t)$, then the matrix A can be used to link the receiving array signal with the sending array signal.

Then the receiving array vector of the nth target UE is:

$$v_n(t) = \begin{bmatrix} v_{n,1}(t) \\ \vdots \\ v_{n,M}(t) \end{bmatrix}$$

After determining the receiving array vector, minimizing the same, even if $MSE_n=0$:

$$MSE_n = \mathbb{E}\left[ \left| v_n^H(t)x_n(t) - d_n \right|^2 \right]$$

It can be obtained that $$d_n = v_n^H(t)x_n(t);$$
$$v_n(t) = \left( A \cdot s_{n,1}(t) \cdot (s_{n,1}(t))^H \cdot A^H + \sigma_e^2 I \right)^{-1} (A \cdot s_{n,1}(t))$$

Let the received signal be xn(t), according to $$xn(t) = d_n = v_n^H(t)x_n(t),$$

the estimated value of the downlink data may be calculated, and then the downlink data sent by the AP is obtained.

In addition, in the related art, Cell-free massive MIMO still has the following problems: the channel differences of TDD is not ideal, such as RF chain asymmetry, interference asymmetry; channel estimation error; and quantization error of channel state information, precoding vectors and combining vectors. However, in the embodiment of the present disclosure, when determining the precoding vector and receiving array combination vector, channel information is not needed, only the position information of the AP and the terminal needs to be estimated, so the above problems will not occur.

Moreover, in the related art, Cell-free massive MIMO still has the problem of inconsistency between the delay and channel change caused by signaling interaction, CPU processing, etc. However, in the embodiment of the present disclosure, complex channel information need not to be exchanged between APs, only position information needs to be exchanged, so this problem will not occur.

In the embodiment of the present disclosure, the first position information of the second access network device and the second position information of the target terminal are obtained; the first position information and the second position information are determined, and the receiving array combination vector corresponding to the precoding coefficient is determined to achieve optimal reception of downlink data. In the embodiment of the present disclosure, the precoding strategy is simple, easy to implement, and can reduce the implementation complexity of massive MIMO.

The signal transmission method provided by the embodiment of the present disclosure is described above, and a signal transmission device, an access network device, and a terminal provided by the embodiment of the present disclosure will be described below with reference to the accompanying drawings.

Figure 6:
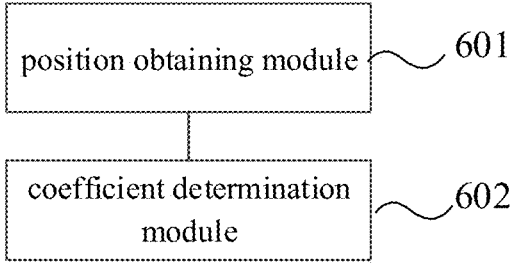
FIG. 6 is a first structural block diagram of the signal transmission processing device provided by an embodiment of the present disclosure.

Referring to FIG. 6, the embodiment of the present disclosure also provides a signal transmission device, which is applied to a first access network device, and the first access network device may be a CPU or a CU; in the embodiment of the present disclosure, if the first access network device is a CPU, then the second access network device is an AP; if the first access network device is a CU, then the second access network device is a distributed unit (DU).

The devices include:

A position obtaining module 601, configured to obtain first position information of a second access network device and obtain second position information of a target terminal.

Wherein, the second access network device may be an AP or a DU; as a first example, with reference to FIG. 2, the method is applied to a CPU as an example, and FIG. 2 includes a CPU, multiple UEs (User1 to UserK0) and multiple APs (AP1 to APM); Cell-free massive MIMO combines traditional concepts such as massive MIMO, small cell, and user-centric Joint Transmission Coordinated MultiPoint (JT-CoMP); a large number of access points (AP, that is, small base stations) are deployed within the coverage area, the purpose is to reduce path loss; all APs jointly serve all UEs, so as to remove interference; all APs are connected to a central processing Unit (CPU), the CPU provides the precoding strategy of the network. With regard to the performance of Cell-free massive MIMO, due to the cooperation between APs, all APs serve all UEs, which is significantly improved the performance to solve interference problems as compared with no cooperation or only cooperation of UEs at the edge of the cell.

The first access network device obtains the first position information of the second access network device and the second position information of the target terminal, the first position information indicates the first position of the second access network device, and the second position information indicates the second position of the target terminal.

A coefficient determination module 602 is configured to determine a precoding coefficient for performing precoding processing on data sent to the target terminal according to the first position information and the second position information.

After determining the first position information and the second position information, the first access network device determines a precoding coefficient according to a preset calculation rule or method; the precoding coefficient is the precoding coefficient for performing precoding processing on downlink data when the second access network device sends the downlink data to the target UE; specifically, traditional precoding refers to using channel state information (CSI) to preprocess the transmitted signal to improve system capacity and reduce BER. In a multi-terminal MIMO scenario, the access network devices use the same frequency and the same slot to communicate with multiple terminal users, so co-channel interference will occur. At this time, it is difficult for the terminal to take effective measures to eliminate the impact of interference, so the access network device needs to adopt a certain technology to eliminate co-channel interference, that is, precoding technology.

Optionally, in this embodiment of the present disclosure, the device includes:

A first processing module, configured to perform precoding processing on data sent to the target terminal according to the precoding coefficient;

and/or a second processing module, configured to send the precoding coefficient to the second access network device.

Optionally, in this embodiment of the present disclosure, the position obtaining module 601 is used to:

receive the first position information sent by the second access network device; or Query the first position information of the second access network device in a preset position information record;

Wherein, the first position information includes coordinate information of the antenna of the second access network device.

Optionally, in this embodiment of the present disclosure, the position obtaining module 601 is used to:

Determine the second position information of the target terminal a position sensing method; or receive the second position information reported by the target terminal;

Wherein, the second position information includes coordinate information of a reference antenna of the target terminal.

Optionally, in this embodiment of the present disclosure, the coefficient determination module 602 includes:

A first determining submodule, configured to determine a first distance between a position indicated by the first position information and a position indicated by the second position information;

a second determining submodule, configured to determine an amplitude and a phase shift of the precoding coefficient according to the first distance; wherein, the amplitude is inversely proportional to the first distance; the phase shift is a product of a wave number and the first distance.

In the embodiment of the present disclosure, the position obtaining module 601 obtains the first position information of the second access network device and the second position information of the target terminal; the coefficient determination module 602 determines a precoding coefficient for performing precoding processing on the data sent to the target terminal according to the first position information and the second position information, so that the first access network device or the second access network device performs the precoding process on the downlink data sent to the target terminal according to the precoding coefficient to eliminate co-channel interference. In the embodiment of the present disclosure, the process of determining the precoding coefficient is simple, easy to implement, and can reduce the implementation complexity of massive MIMO.

Figure 7:
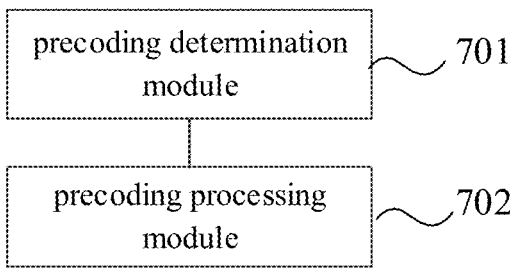
FIG. 7 is a second structural block diagram of the signal transmission processing device provided by an embodiment of the present disclosure.

Referring to FIG. 7, an embodiment of the present disclosure further provides a signal transmission device, which is applied to a second access network device. Optionally, the second access network device is an AP. FIG. 2 includes CPU, multiple UEs (User1 to UserK0) and multiple APs (AP1 to APM); Cell-free massive MIMO combines traditional concepts such as massive MIMO, small cell, and user-centric JT-CoMP; APs are deployed within the coverage area to reduce path loss; all APs jointly serve all UEs to remove interference; all APs are connected to one CPU, and the CPU gives the precoding strategy of the network. With regard to the performance of Cell-free massive MIMO, due to the cooperation between APs, all APs serve all UEs, the performed is significantly improved to solve interference problem as compared with no cooperation or only cooperation of the UE at the edge of the cell.

The devices include:

A precoding determination module 701, configured to determine a precoding coefficient for performing precoding processing on data sent to the target terminal; wherein, the precoding coefficient is determined by the second access network device or the first access network device according to the first position information of the second access network device and the second position information of the target terminal.

Wherein, the precoding coefficient is the precoding coefficient for performing precoding processing on the downlink data when the second access network device sends the downlink data to the target UE; in the embodiment of the present disclosure, the precoding coefficient is determined by the second access network device or the first access network device according to the first position information of the second access network device and the second position information of the target terminal. For example, after the second access network device obtains the second position information of the target UE, it determines the precoding coefficient according to the first position information and the second position information; or, after the first access network device (such as a CPU) determines the precoding coefficient according to the first position information and the second position information, it sends the precoding coefficient to the second access network device.

A precoding processing module 702 is configured to perform precoding processing on data sent to the target terminal according to the precoding coefficient.

After the second access network device determines the precoding coefficient, it performs precoding processing on the downlink data sent to the target UE to eliminate co-channel interference; specifically, precoding refers to processing and using CSI to preprocess the transmitted signal to improve the system capacity and reduce bit error rate. In a multi-terminal MIMO scenario, the access network device uses the same frequency and the same slot to communicate with multiple terminal users, so co-channel interference will occur. At this time, it is difficult for the terminal to take effective measures to eliminate the impact of interference, so the access network device needs to adopt certain technologies to eliminate co-channel interference, which is, precoding processing.

Taking the second access network device as an AP as an example, in the downlink massive MIMO system, the set of APs is $B=\{1, \ldots, B\}$, each AP has M transmitting antennas, and M is a positive integer greater than or equal to 1; the precoding coefficient is corresponding to each transmitting antenna; for example, the CPU calculates a precoding coefficient of each transmitting antenna of the AP according to the first position information of all antennas of the AP and the second position information of the target UE, so that signals of all the transmitting antennas of the AP focus on the second position information of the target UE.

Optionally, in this embodiment of the present disclosure, the precoding determination module 701 includes:

A coefficient receiving submodule, configured to receive the precoding coefficient sent by the first access network device;

or

A position obtaining submodule, configured to obtain the first position information of the second access network device and second position information of the target terminal; determine the precoding coefficient according to the first position information and the second position information.

Optionally, in this embodiment of the present disclosure, the position obtaining submodule is used to:

receive the first position information of the second access network device sent by the first access network device;

or measure the first position information of the second access network device.

Optionally, in this embodiment of the present disclosure, the position obtaining submodule is used to:

receive the second position information sent by the first access network device or the target terminal;

determine the second position information in a position sensing method.

Optionally, in this embodiment of the present disclosure, the position obtaining submodule is used to:

determine a first distance between a position indicated by the first position information and a position indicated by the second position information;

Determine an amplitude and a phase shift of the precoding coefficient according to the first distance; wherein, the amplitude is inversely proportional to the first distance; and the phase shift is a product of a preset wave number and the first distance.

Optionally, in the embodiment of the present disclosure, the device further includes:

A first sending module, configured to send the first position information to the first access network device; wherein, the first position information includes coordinate information of an antenna of the second access network device.

Optionally, in the embodiment of the present disclosure, the device further includes:

A second sending module, configured to send the first position information to the target terminal.

In this embodiment of the present disclosure, the precoding determination module 701 determines the precoding coefficient for performing precoding processing on the data sent to the target terminal; the precoding processing module 702 performs the precoding processing on the data sent to the target terminal according to the precoding coefficient, to eliminate co-channel interference. In the embodiment of the present disclosure, the process of determining the precoding coefficient is simple, easy to implement, and can reduce the implementation complexity of massive MIMO.

Figure 8:
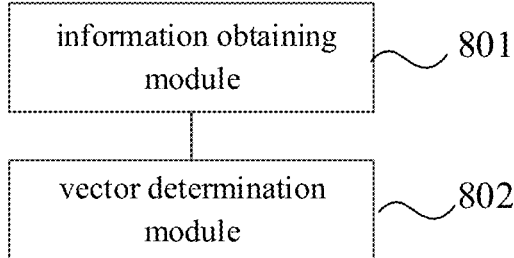
FIG. 8 is a third structural block diagram of the signal transmission processing device provided by an embodiment of the present disclosure.

Referring to FIG. 8, the embodiment of the present disclosure also provides a signal transmission device, which is applied to a target terminal. Referring to FIG. 2, FIG. 2 includes CPU, multiple UEs (User1 to UserK0) and multiple APs (AP1 to APM); the target terminal is any UE from User1 to UserK0; Cell-free massive MIMO combines traditional concepts such as massive MIMO, small cell, and user-centered JT-CoMP; the purpose of deploying APs within the coverage area is to reduce path loss; all APs jointly serve all UEs, the purpose is to remove interference; all APs are connected to one CPU, and the CPU provides the precoding strategy of the network. With regard to the performance of Cell-free massive MIMO, due to the cooperation between APs, all APs serve all UEs, which is significantly improved the performance to solve interference problem as compared with no cooperation or only cooperation of the UE at the edge of the cell.

The devices include:

An information obtaining module 801, configured to obtain first position information of a second access network device and obtain second position information of a target terminal.

The second access network device may be an AP or a DU; in the downlink massive MIMO system, each AP has M transmitting antennas, and M is a positive integer greater than or equal to 1.

A vector determination module 802, configured to determine the first position information and the second position information, and determining a receiving array combination vector corresponding to a precoding coefficient;

Wherein, the precoding coefficient is determined by the second access network device or the first access network device according to the first position information and the second position information.

The precoding coefficient is a precoding coefficient corresponding to each transmitting antenna. For example, the precoding coefficient of each transmitting antenna of the AP is calculated according to the first position information of all antennas of the AP and the second position information of the target UE, so that signals of all transmitting antennas of the AP focus on the second position information of the target UE.

The target UE determines a receiving array combination vector corresponding to the precoding coefficient according to the first position information and the second position information, so as to receive the precoded downlink data and realize optimal reception of the downlink data.

Optionally, in this embodiment of the present disclosure, the information obtaining module 801 includes:

a first receiving submodule, configured to receive the first position information of the second access network device sent by the second access network device.

Optionally, in this embodiment of the present disclosure, the information obtaining module 801 includes a second receiving submodule, configured to receive the second position information of the target terminal sent by the first access network device;

or a measurement submodule, configured to measure second position information of the target terminal;

Wherein, the second position information includes coordinate information of a reference antenna of the target terminal.

Optionally, in this embodiment of the present disclosure, the vector determination module 802 includes:

a distance determination submodule, configured to determine a first distance between a position indicated by the first position information and a position indicated by the second position information;

a matrix determination submodule, configured to determine a received signal matrix between the target terminal and the second access network device according to the first distance;

a vector determining submodule, configured to determine a receiving array combining vector according to the receiving signal matrix and a first data relationship.

In an optional embodiment, the first data relationship is shown in the following formula 1:

$$v_n(t) = \left( A \cdot s_{n,1}(t) \cdot (s_{n,1}(t))^H \cdot A^H + \sigma_e^2 I \right)^{-1} (A \cdot s_{n,1}(t))$$

Wherein, $v_n(t)$ represents the receiving array combination vector; I represents an identity matrix, and $$\sigma_e^2$$

represents a noise variance, i.e. the noise variance of the transmitted signal;

$s_{n,\,1}(t)$ represents the received signal of the reference antenna of the target terminal, that is, the elements in the received signal matrix;

$$s_{n,1}(t) = [s_{n,1,1}(t), \dots, s_{n,1,k}(t) \dots, s_{n,1,K0}(t)]^T$$

k represents the first serial number of the second access network device, and the value range of k is 1 to K0; n represents the second serial number of the target terminal;

A represents the received signal matrix, wherein the kth column is $$A_k = \begin{bmatrix} 1 \\ \dfrac{r_k}{d_{2,k}} e^{j\frac{2\pi}{\lambda}r_k - j\frac{2\pi}{\lambda}d_{2,k}} \\ \vdots \\ \dfrac{r_k}{d_{M,k}} e^{j\frac{2\pi}{\lambda}r_k - j\frac{2\pi}{\lambda}d_{M,k}} \end{bmatrix}$$

$d_{m,\,k}$ represents the first distance, $d_{1,\,k} = r_k$; m represents the third serial number of the reference antenna of the target terminal, and the value range of m is 1 to M.

In this embodiment of the present disclosure, the information obtaining module 801 obtains the first position information of the second access network device and the second position information of the target terminal; the vector determination module 802 determines the receiving array combination vector corresponding to the precoding coefficient according to the first position information and the second position information, so as to realize the optimal reception of the downlink data. In the embodiment of the present disclosure, the precoding strategy is simple, easy to implement, and can reduce the implementation complexity of massive MIMO.

It should be noted that the division of modules (units) in the embodiment of the present disclosure is schematic, and is only a logical function division, and there may be another division method in actual implementation. In addition, each functional module in each embodiment of the present disclosure may be integrated into one processing module, each module may exist separately physically, or two or more modules may be integrated into one module. The integrated module can be implemented in the form of hardware or in the form of software function modules.

If the integrated module are realized in the form of software function modules and sold or used as independent products, they can be stored in a processor-readable storage medium. Based on this understanding, the technical solution of the present disclosure is essentially or part of the contribution to the prior art or all or part of the technical solution can be embodied in the form of a software product, and the computer software product is stored in a storage medium, including several instructions for enabling a computer device (which may be a personal computer, a server, or a network device, etc.) or a processor to execute all or part of the steps of the methods described in the various embodiments of the present disclosure. The storage medium include: U disk, mobile hard disk, read-only memory (ROM), random access memory (RAM), magnetic disk or optical disk and other media that can store program codes.

What needs to be explained here is that the device provided by the embodiment of the present disclosure can realize all the method steps realized by the method embodiment, and can achieve the same technical effect. The same part and the beneficial effect are not described in detail.

Figure 9:
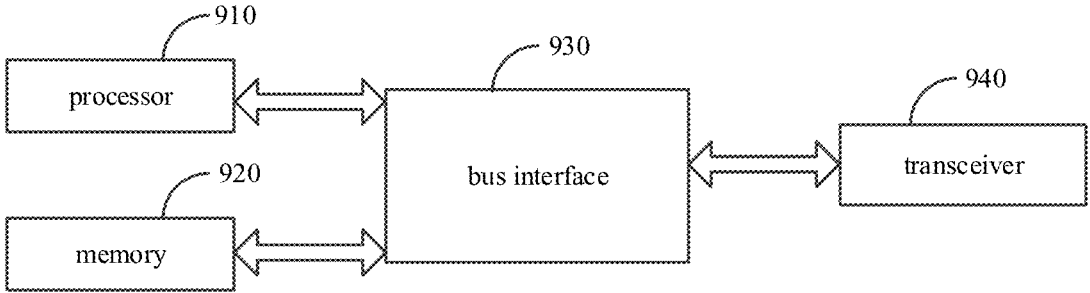
FIG. 9 is a first structural block diagram of the access network device provided by an embodiment of the present disclosure.

Referring to FIG. 9, an embodiment of the present disclosure also provides an access network device, the access network device is a first access network device, and the access network device includes:

A memory 920, a transceiver 940, a processor 910;

The memory 920 is used for storing computer programs;

The transceiver 940 is used for receiving and sending data under the control of processor 910;

The processor 910 is configured to read the computer program in the memory 920 and perform the following operations:

obtaining first position information of a second access network device and obtaining second position information of a target terminal.

determining a precoding coefficient for performing precoding processing on data sent to the target terminal according to the first position information and the second position information.

Optionally, in this embodiment of the present disclosure, after the determining the precoding coefficients for performing precoding processing on the data sent to the target terminal, the processor is further configured to:

perform precoding processing on data sent to the target terminal according to the precoding coefficient; and/or send the precoding coefficient to the second access network device.

Optionally, in this embodiment of the present disclosure, the processor is further configured to read the computer program in the memory and perform the following operations:

receiving the first position information sent by the second access network device; or Querying the first position information of the second access network device in a preset position information record;

Wherein, the first position information includes coordinate information of the antenna of the second access network device.

Optionally, in this embodiment of the present disclosure, the processor is further configured to read the computer program in the memory and perform the following operations:

Determining the second position information of the target terminal a position sensing method; or receiving the second position information reported by the target terminal;

Wherein, the second position information includes coordinate information of a reference antenna of the target terminal.

Optionally, in this embodiment of the present disclosure, the processor is further configured to read the computer program in the memory and perform the following operations:

determining a first distance between a position indicated by the first position information and a position indicated by the second position information;

determining an amplitude and a phase shift of the precoding coefficient according to the first distance; wherein, the amplitude is inversely proportional to the first distance; the phase shift is a product of a wave number and the first distance.

Wherein, in FIG. 9, the bus architecture may include any number of interconnected buses and bridges, specifically various circuits of one or more processors 910 represented by the processor 910 and the memory 920 represented by the memory 920 are linked together. The bus architecture can also link together various other circuits such as peripherals, voltage regulators, and power management circuits, etc., which are well known in the art and therefore will not be further described herein. Bus interface 930 provides the interface. Transceiver 940 may be a plurality of elements, including a transmitter and a receiver, providing a unit for communicating with various other devices over transmission medium, including wireless channels, wired channels, optical cables, and other transmission medium. The processor 910 is responsible for managing the bus architecture and general processing, and the memory 920 may store data used by the processor 910 when performing operations.

The processor 910 may be a central processor (CPU), an application specific integrated circuit (ASIC), a field programmable gate array (FPGA) or a complex programmable logic device (CPLD), the processor 910 may also adopt a multi-core architecture.

The processor 910 is configured to execute any of the methods provided in the embodiments of the present disclosure according to the obtained executable instructions by calling the computer program stored in the memory 920. The processor 910 and the memory 920 may also be arranged physically separately.

Figure 10:
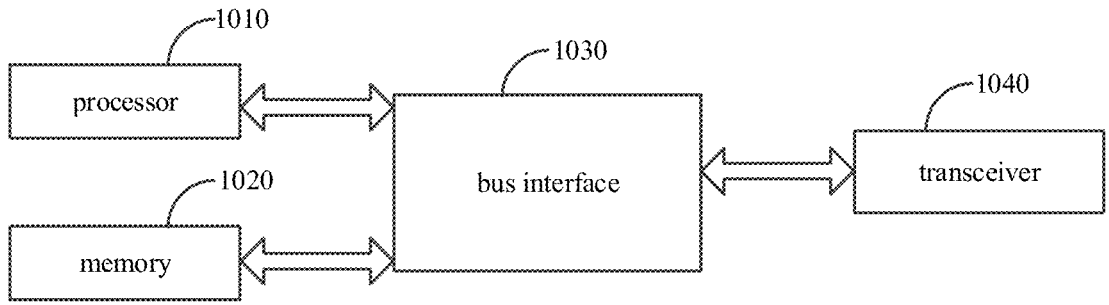
FIG. 10 is a second structural block diagram of the access network device provided by an embodiment of the present disclosure.

Referring to FIG. 10, an embodiment of the present disclosure further provides an access network device, the access network device is a second access network device, and the access network device includes:

A memory 1020, a transceiver 1040, a processor 1010;

The memory 1020 is used for storing computer programs;

The transceiver 1040 is used for receiving and sending data under the control of processor 1010;

The processor 1010 is configured to read the computer program in the memory 1020 and perform the following operations:

determining a precoding coefficient for performing precoding processing on data sent to the target terminal; wherein, the precoding coefficient is determined by the second access network device or the first access network device according to the first position information of the second access network device and the second position information of the target terminal.

Performing precoding processing on data sent to the target terminal according to the precoding coefficients.

Optionally, in the embodiment of the present disclosure, the processor is further configured to read the computer program in the memory and perform the following operations:

receiving the precoding coefficient sent by the first access network device;

or obtaining the first position information of the second access network device and second position information of the target terminal; determine the precoding coefficient according to the first position information and the second position information.

Optionally, in this embodiment of the present disclosure, the processor is further configured to read the computer program in the memory and perform the following operations:

receiving the first position information of the second access network device sent by the first access network device;

or measuring the first position information of the second access network device.

Optionally, in this embodiment of the present disclosure, the processor is further configured to read the computer program in the memory and perform the following operations:

receiving the second position information sent by the first access network device or the target terminal;

determining the second position information in a position sensing method.

Optionally, in this embodiment of the present disclosure, the processor is further configured to read the computer program in the memory and perform the following operations:

determining a first distance between a position indicated by the first position information and a position indicated by the second position information;

Determining an amplitude and a phase shift of the precoding coefficient according to the first distance; wherein, the amplitude is inversely proportional to the first distance; and the phase shift is a product of a preset wave number and the first distance.

Optionally, in this embodiment of the present disclosure, before receiving the precoding coefficient sent by the first access network device, the processor is further configured to:

send the first position information to the first access network device; wherein, the first position information includes coordinate information of an antenna of the second access network device.

Optionally, in this embodiment of the present disclosure, the processor is further configured to:

Send the first position information to the target terminal.

Wherein, in FIG. 10, the bus architecture may include any number of interconnected buses and bridges, specifically various circuits of one or more processors 1010 represented by the processor 1010 and the memory 1020 represented by the memory 1020 are linked together. The bus architecture can also link together various other circuits such as peripherals, voltage regulators, and power management circuits, etc., which are well known in the art and therefore will not be further described herein. The bus interface 1030 provides the interface. Transceiver 1040 may be a plurality of elements, including a transmitter and a receiver, providing a unit for communicating with various other devices over transmission medium, including wireless channels, wired channels, optical cables, and other transmission medium. The processor 1010 is responsible for managing the bus architecture and general processing, and the memory 1020 can store data used by the processor 1010 when performing operations.

The processor 1010 may be a central processor (CPU), an application specific integrated circuit (ASIC), a field programmable gate array (FPGA) or a complex programmable logic device (CPLD), the processor 1010 may also adopt a multi-core architecture.

The processor 1010 is configured to execute any of the methods provided in the embodiments of the present disclosure according to the obtained executable instructions by calling the computer program stored in the memory 1020. The processor 1010 and the memory 1020 may also be arranged physically separately.

Figure 11:
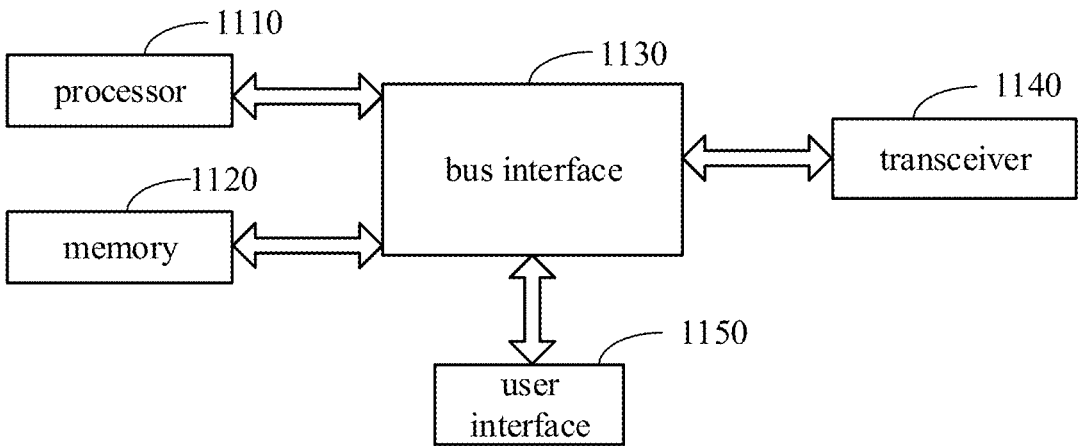
FIG. 11 is a structural block diagram of a terminal provided by an embodiment of the present disclosure.

Referring to FIG. 11, an embodiment of the present disclosure also provides a terminal, the terminal is a target terminal, and the terminal includes:

A memory 1120, a transceiver 1140, a processor 1110;

The memory 1120 is used for storing computer programs;

The transceiver 1140 is used for receiving and sending data under the control of processor 1110;

The processor 1110 is configured to read the computer program in the memory 1120 and perform the following operations:

obtaining first position information of a second access network device and obtaining second position information of the target terminal;

determining the first position information and the second position information, and determining a receiving array combination vector corresponding to a precoding coefficient;

Wherein, the precoding coefficient is determined by the second access network device or the first access network device according to the first position information and the second position information.

Optionally, in this embodiment of the present disclosure, the processor is further configured to read the computer program in the memory and perform the following operations:

Receive the first position information of the second access network device sent by the second access network device.

Optionally, in this embodiment of the present disclosure, the processor is further configured to read the computer program in the memory and perform the following operations:

receiving the second position information of the target terminal sent by the first access network device;

or measuring second position information of the target terminal;

Wherein, the second position information includes coordinate information of a reference antenna of the target terminal.

Optionally, in this embodiment of the present disclosure, the processor is further configured to read the computer program in the memory and perform the following operations:

determining a first distance between a position indicated by the first position information and a position indicated by the second position information;

determining a received signal matrix between the target terminal and the second access network device according to the first distance;

determining a receiving array combining vector according to the receiving signal matrix and a first data relationship.

Optionally, in this embodiment of the present disclosure, the first data relationship is shown in the following formula 1:

$$v_n(t) = \left( A \cdot s_{n,1}(t) \cdot (s_{n,1}(t))^H \cdot A^H + \sigma_e^2 I \right)^{-1} (A \cdot s_{n,1}(t))$$

Wherein, $v_n(t)$ represents the receiving array combination vector; I represents an identity matrix, and $$\sigma_e^2$$

represents a noise variance, i.e. the noise variance of the transmitted signal;

$s_{n,1}(t)$ represents the received signal of the reference antenna of the target terminal, that is, the elements in the received signal matrix;

$$s_{n,1}(t) = [s_{n,1,1}(t), \ldots, s_{n,1,k}(t) \ldots , s_{n,1,K0}(t)]^T$$

k represents the first serial number of the second access network device, and the value range of k is 1 to K0; n represents the second serial number of the target terminal;

A represents the received signal matrix, wherein the kth column is $$A_k = \begin{bmatrix} 1 \\ \dfrac{r_k}{d_{2,k}} e^{j\frac{2\pi}{\lambda}r_k - j\frac{2\pi}{\lambda}d_{2,k}} \\ \vdots \\ \dfrac{r_k}{d_{M,k}} e^{j\frac{2\pi}{\lambda}r_k - j\frac{2\pi}{\lambda}d_{M,k}} \end{bmatrix}$$

$d_{m,k}$ represents the first distance, $d_{1,k} = r_k$; m represents the third serial number of the reference antenna of the target terminal, and the value range of m is 1 to M.

Wherein, in FIG. 11, the bus architecture may include any number of interconnected buses and bridges, specifically various circuits of one or more processors 1110 represented by the processor 1110 and the memory 1120 represented by the memory 1120 are linked together. The bus architecture can also link together various other circuits such as peripherals, voltage regulators, and power management circuits, etc., which are well known in the art and therefore will not be further described herein. Bus interface 1130 provides the interface. Transceiver 1140 may be a plurality of elements, including a transmitter and a receiver, providing a unit for communicating with various other devices over transmission medium, including wireless channels, wired channels, optical cables, and other transmission medium. The processor 1110 is responsible for managing the bus architecture and general processing, and the memory 1120 can store data used by the processor 1110 when performing operations. For different user equipments, the user interface 1150 may also be an interface capable of connecting externally and internally to required device, and the connected device includes but not limited to a keypad, a display, a speaker, a microphone, a joystick, and the like.

The processor 1110 may be a central processor (CPU), an application specific integrated circuit (ASIC), a field programmable gate array (FPGA) or a complex programmable logic device (CPLD), the processor 1110 may also adopt a multi-core architecture.

The processor 1110 is configured to execute any of the methods provided in the embodiments of the present disclosure according to the obtained executable instructions by calling the computer program stored in the memory 1120. The processor 1110 and the memory 1120 may also be arranged physically separately.

What needs to be explained here is that the access network device, the terminal, and the device provided by the embodiments of the present disclosure can realize all the method steps realized by the method embodiments, and can achieve the same technical effect. In the example, the same parts and beneficial effects as those of the method embodiment are not described in detail.

The embodiment of the present disclosure also provides a processor-readable storage medium, a computer program is stored in the processor-readable storage medium, and the computer program is used to cause the processor to execute the signal transmission method.

The processor-readable storage medium can be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage medium (including but not limited to disk storage and optical storage, etc.) having computer-usable program code embodied therein.

The present disclosure is described with reference to flowcharts and/or block diagrams of methods, apparatus (systems), and computer program products according to embodiments of the present disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, so that instructions executed by the processor of the computer or other programmable data processing equipment produce elements for realizing the functions specified in one or more procedures of a flowchart and/or one or more blocks of a block diagram.

These processor-executable instructions may also be stored in a processor-readable memory capable of directing a computer or other programmable data processing device to operate in a specific manner, so that the instructions stored in the processor-readable memory produce a manufacturing product, the instruction device realizes the function specified in one or more procedures of the flow chart and/or one or more blocks of the block diagram.

These processor-executable instructions can also be loaded onto a computer or other programmable data processing device, causing a series of operational steps to be performed on the computer or other programmable device to produce a computer-implemented processing, so that the instruction executed on the computer or other programmable device provide steps for implementing the functions specified in the flowchart procedure or procedures and/or block diagram procedures or blocks.

The device embodiments described above are only illustrative, and the units described as separate components may or may not be physically separated, and the components shown as units may or may not be physical units, that is, they may be located in one place, or it can be distributed to multiple network elements. Part or all of the modules can be selected according to actual needs to achieve the purpose of the solution of the embodiment. It can be understood and implemented by those skilled in the art without any creative work.

The various component embodiments of the present disclosure may be implemented in hardware, or in software modules running on one or more processors, or in a combination thereof. Those skilled in the art should understand that a microprocessor or a digital signal processor (DSP) may be used in practice to implement some or all functions of some or all components in the computing processing device according to the embodiments of the present disclosure. The present disclosure can also be implemented as a device or device program (e.g., computer program and computer program product) for performing a part or all of the methods described herein. Such a program realizing the present disclosure may be stored on a computer-readable medium, or may have the form of one or more signals. Such a signal may be downloaded from a website, or provided on a carrier signal, or provided in any other form.

Figure 12:
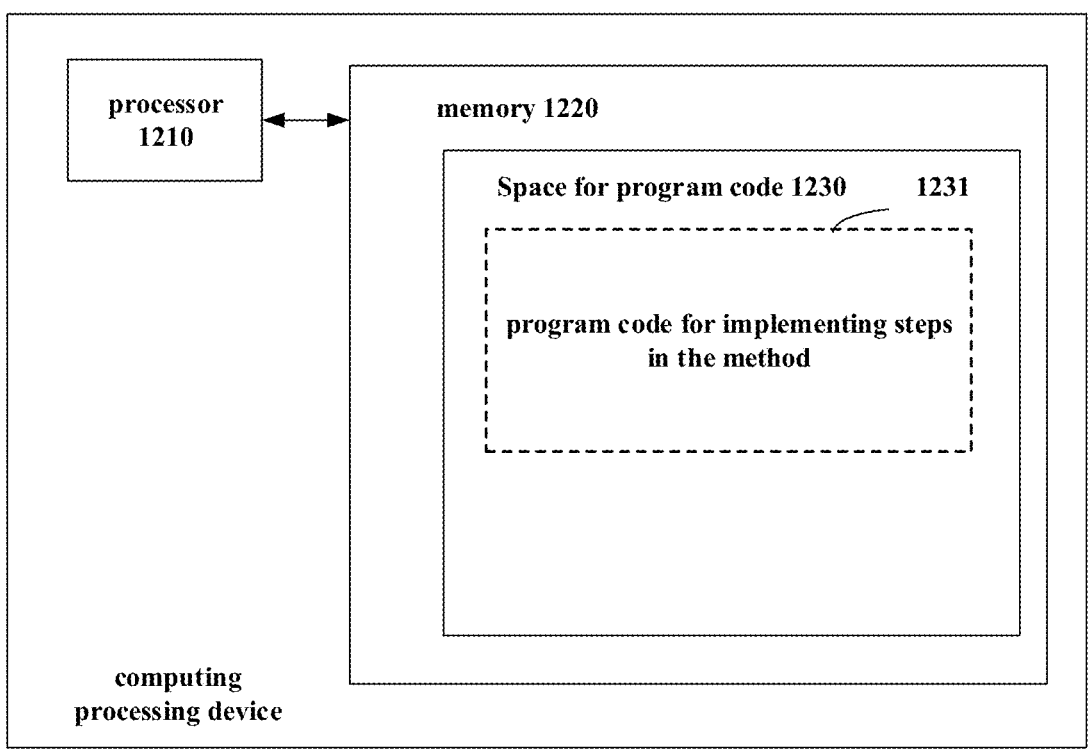
FIG. 12 schematically illustrates a block diagram of a computing processing device for performing the method according to the present disclosure; moreover FIG. 13 schematically illustrates a memory unit for storing or carrying program code for implementing the method according to the present disclosure.
Figure 13:
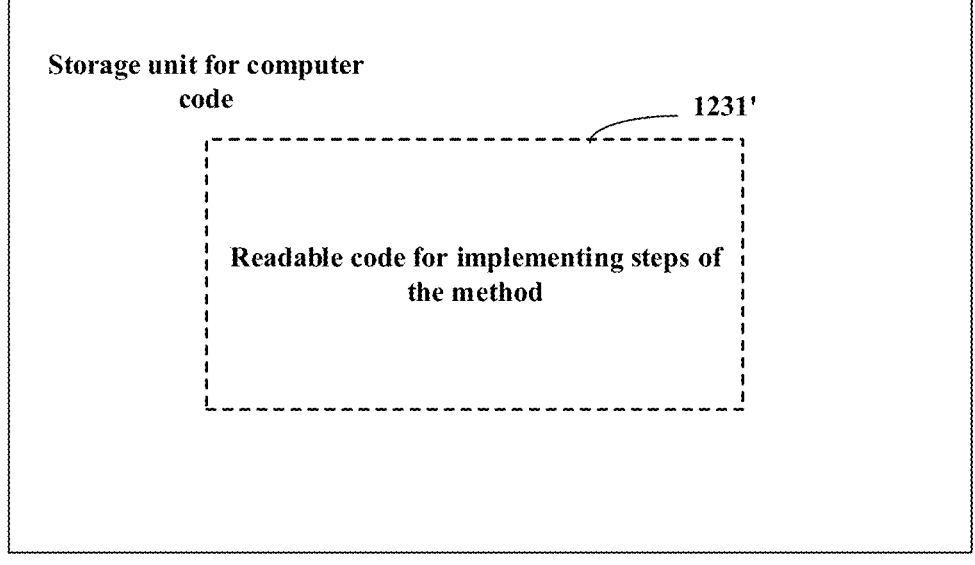

For example, FIG. 12 illustrates a computing processing device that may implement methods according to the present disclosure. The computing processing device conventionally includes a processor 1210 and a computer program product or computer readable medium in the form of memory 1220. Memory 1220 may be electronic memory such as flash memory, Electrically Erasable Programmable Read Only Memory (EEPROM), EPROM, hard disk, or ROM. The memory 1220 has a storage space 1230 for program code 1231 for performing any steps in the methods described above. For example, the storage space 1230 for program codes may include respective program codes 1231 for respectively implementing various steps in the above methods. These program codes can be read from or written into one or more computer program products. These computer program products include program code carriers such as hard disks, compact disks (CDs), memory cards or floppy disks. Such a computer program product is typically a portable or fixed storage unit as described with reference to FIG. 13. The storage unit may have storage segments, storage spaces, etc. arranged similarly to the memory 1220 in the computing processing device of FIG. 12. The program code can be compressed in a suitable form. Typically, the memory unit includes computer readable code 1231', i.e. code readable by, for example, a processor such as 1210, these codes are executed by a computing processing device so that the computing processing device performs each step of the above methods.

"One embodiment," "an embodiment," or "one or more embodiments" means that a particular feature, structure, or characteristic described in connection with the embodiment is included in at least one embodiment of the present disclosure. Additionally, the word "in one embodiment" herein do not necessarily refer to the same embodiment.

In the description provided herein, numerous specific details are set forth. However, it is understood that embodiments of the present disclosure may be practiced without these specific details. In some instances, well-known methods, structures and techniques have not been shown in detail in order not to obscure the understanding of the description.

In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The disclosure can be implemented by means of hardware comprising several distinct elements, and by means of a suitably programmed computer. In a unit claim enumerating several means, several of these means can be embodied by one same hardware. The use of the words first, second, and third, etc. does not indicate any order. These words can be interpreted as names.

Finally, it should be noted that: the above embodiments are only used to illustrate the technical solutions of the present disclosure, rather than to limit them; although the present disclosure has been described in detail with reference to the embodiments, those of ordinary skill in the art should understand that modifications may be made to the technical solutions described in the embodiments, or equivalent replacements are made to some of the technical features; and these modifications or replacements do not make the essence of the corresponding technical solutions deviate from the spirit and scope of the technical solutions of the embodiments of the present disclosure.

What is claimed is:

1. A signal transmission method, performed by a first access network device, comprising:
   obtaining first position information of a second access network device and obtaining second position information of a target terminal;
   determining a precoding coefficient for performing precoding processing on data sent to the target terminal according to the first position information and the second position information;
   sending the precoding coefficient to the second access network device;
   wherein the first access network device and the second access network device are different access network devices.

2. The signal transmission method according to claim 1, wherein the obtaining first position information of a second access network device includes:
   receiving the first position information sent by the second access network device; or
   querying the first position information of the second access network device in a preset position information record;

wherein the first position information includes coordinate information of an antenna of the second access network device.

3. The signal transmission method according to claim 1, wherein the obtaining second position information of a target terminal includes:

determining the second position information of the target terminal by a position sensing method; or receiving the second position information reported by the target terminal;

wherein the second position information includes coordinate information of a reference antenna of the target terminal.

4. The signal transmission method according to claim 1, wherein the determining a precoding coefficient for performing precoding processing on data sent to the target terminal according to the first position information and the second position information includes:

determining a first distance between a position indicated by the first position information and a position indicated by the second position information;

determining an amplitude and a phase shift of the precoding coefficient according to the first distance; wherein, the amplitude is inversely proportional to the first distance; the phase shift is a product of a wave number and the first distance.

5. An access network device, comprising: a memory, a transceiver, and a processor, wherein the memory is configured to store computer programs; the transceiver is configured to send and receive data under the control of a processor; the processor is configured to read the computer programs in the memory and perform the signal transmission method according to claim 1.

6. A signal transmission method, performed by a second access network device, comprising:

determining a precoding coefficient for performing precoding processing on data sent to a target terminal; wherein, the precoding coefficient is received from a first access network device after the first access network device determines the precoding coefficient according to first position information of the second access network device and second position information of the target terminal;

performing precoding processing on the data sent to the target terminal according to the precoding coefficient;

wherein the first access network device and the second access network device are different access network devices.

7. The signal transmission method according to claim 6, wherein the determining the precoding coefficient for performing precoding processing on data sent to a target terminal includes:

receiving the precoding coefficient sent by the first access network device.

8. The signal transmission method according to claim 7, wherein before receiving the precoding coefficient sent by the first access network device, the method further includes:

sending the first position information to the first access network device; wherein, the first position information includes coordinate information of an antenna of the second access network device.

9. The signal transmission method according to claim 6, wherein the method further comprises:

sending the first position information to the target terminal.

10. An access network device, comprising a memory, a transceiver, and a processor; wherein the memory is configured to store computer programs; the transceiver is configured to send and receive data under the control of a processor; the processor is configured to read the computer programs in the memory and perform the signal transmission method according to claim 6.

* * * * *